Figure 1:
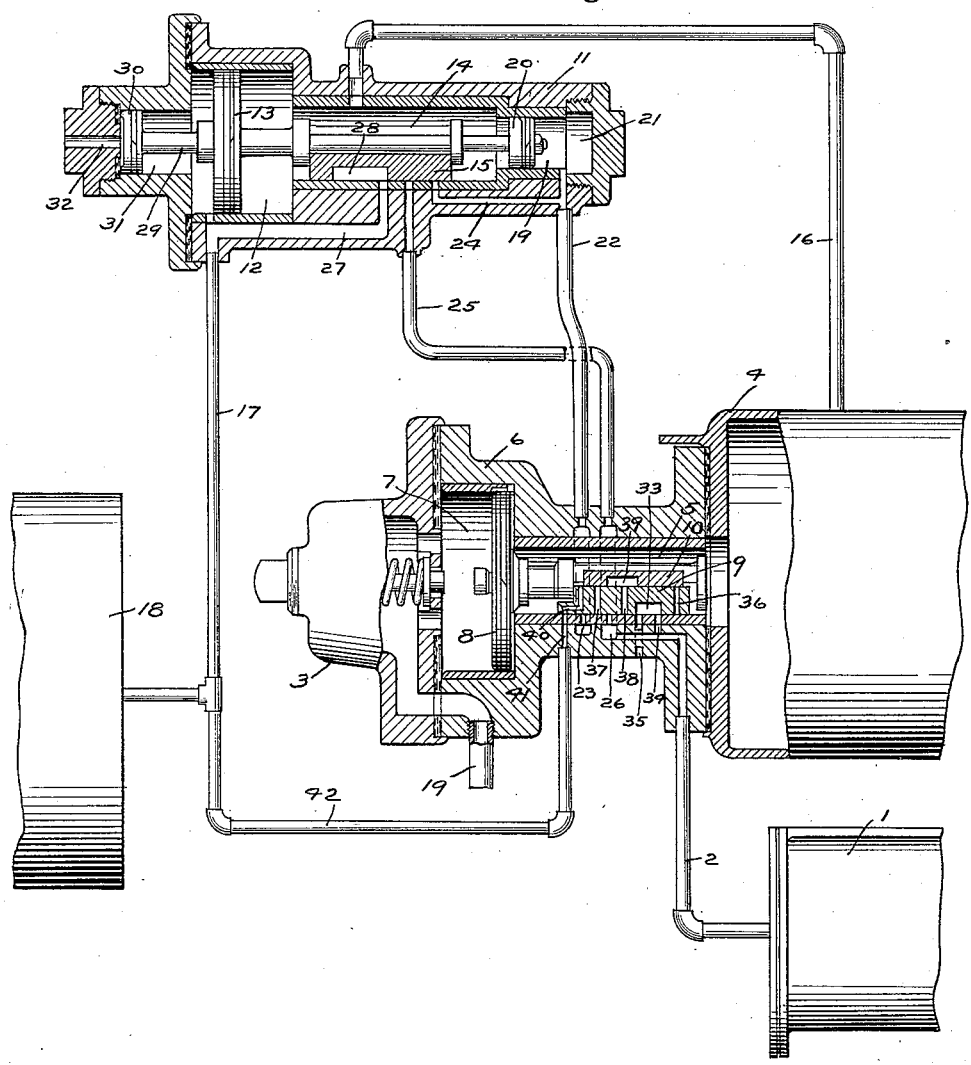

W. V. TURNER.
FLUID PRESSURE BRAKE.
APPLICATION FILED SEPT. 19, 1908.

1,069,358.

Patented Aug. 5, 1913.

2 SHEETS—SHEET 1.

WITNESSES

INVENTOR

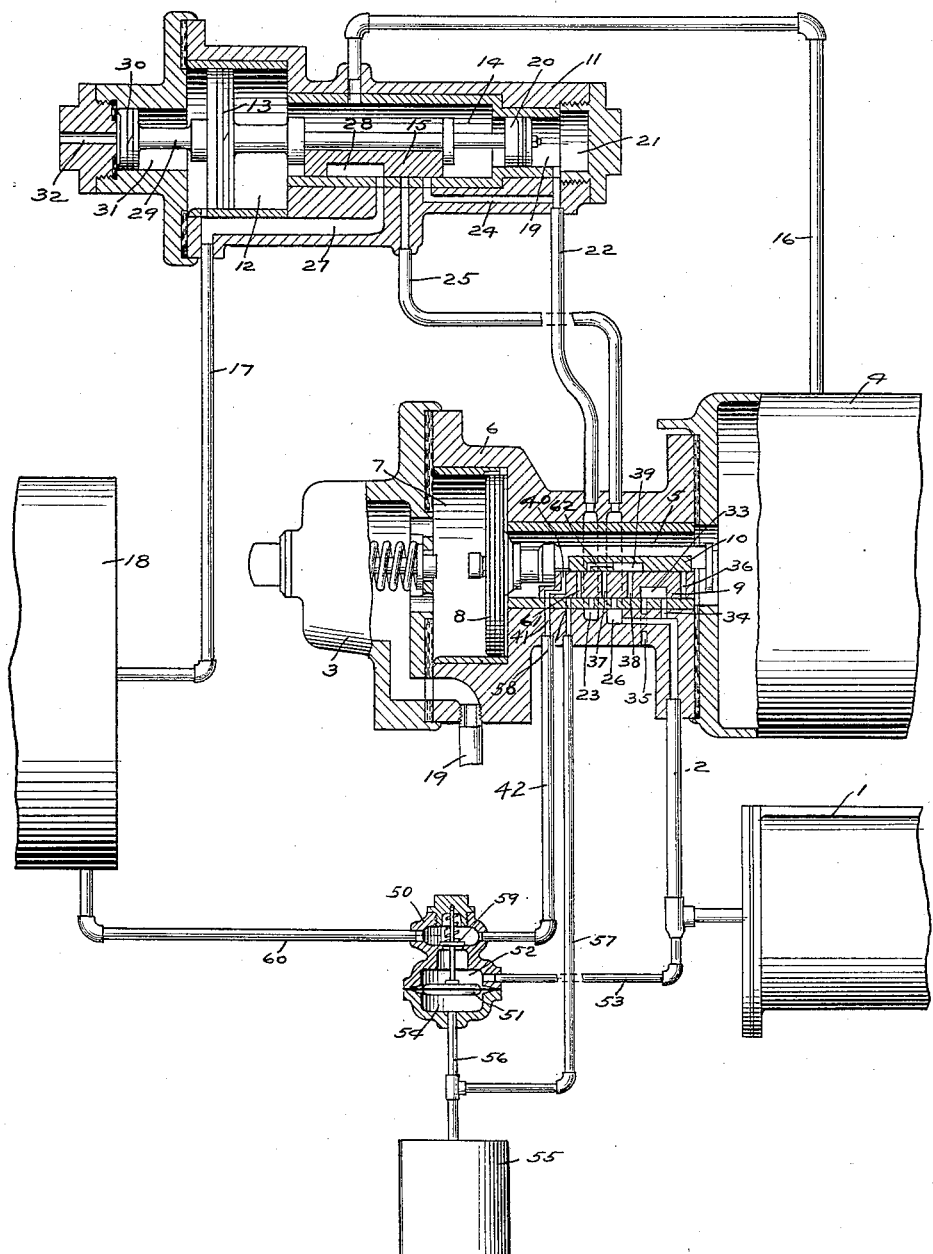

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

FLUID-PRESSURE BRAKE.

1,069,358. Specification of Letters Patent. Patented Aug. 5, 1913.

Application filed September 19, 1908. Serial No. 453,758.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure Brakes, of which the following is a specification.

This invention relates to fluid pressure brakes, and has for its main object to provide means whereby a uniform degree of pressure may be obtained in all the brake cylinders of the cars in a train for a given brake pipe reduction regardless of the length of travel of the brake piston.

With the present standard equipment, the volume of the auxiliary reservoir is calculated on the assumption that the brake cylinder piston travel is of a constant predetermined amount, while in actual practice it is found that the piston travel varies considerably on different cars owing to wear of brake shoes, stretching of brake rigging, and various other causes, so that instead of obtaining the same brake cylinder pressure on each car upon a predetermined reduction in brake pipe pressure, the pressure varies according as the piston travel is greater or less than the standard.

According to the present invention, I propose to provide a valve mechanism subject to the opposing pressures of the auxiliary reservoir and a constant pressure and operating when the brake cylinder pressure rises at a less rate than a given fall in auxiliary reservoir pressure would give for a predetermined brake piston travel to supply additional fluid to the brake cylinder and thereby produce a uniform brake cylinder pressure on all the cars of the train regardless of the piston travel.

In the accompanying drawings, Figure 1 is a view of a car air brake equipment, with my improvements applied thereto and Fig. 2 a similar view including means for maintaining the brake cylinder pressure constant at a predetermined degree of pressure.

In Fig. 1 of the drawings, the construction illustrated comprises a brake cylinder 1 connected by pipe 2 to triple valve device 3 and auxiliary reservoir 4 opening to the valve chamber 5 of the triple valve device 3, the triple valve device comprising a casing 6 having a piston chamber 7 connected to brake pipe 19 and within which the triple valve piston 8 operates, main slide valve 9, and an auxiliary or graduating valve 10 mounted on and having a movement relative to the main slide valve. All of which apparatus may be of the usual standard construction.

In addition to the above, I provide a valve mechanism comprising a casing 11 having piston chamber 12 containing a movable abutment 13 and a valve chamber 14 containing a slide valve 15. Valve chamber 14 is in open communication with the auxiliary reservoir 4 through pipe 16 and piston chamber 12 at the outer face of abutment 13 is connected by pipe 17 to a supplemental reservoir 18. On the valve chamber side of the valve mechanism the casing is extended to form a piston chamber 19 containing a small piston 20 and chamber 21 at the outer face of this piston is open to a pipe 22 leading to a port opening 23 in the seat of the main slide valve 9, pipe 22 also communicating with a passage 24 leading to the valve seat of slide valve 15. In addition to the passage 24, the slide valve 15 controls a port opening to pipe 25 which leads to brake cylinder port 26 controlled by the main slide valve 9 and passage 27 communicating with pipe 17, the slide valve 15 being adapted when shifted to its inner position to connect passage 27, pipe 25 and passage 24 through cavity 28 therein.

The outer face of abutment 13 carries an extended stem 29 on which is mounted a piston 30 moving in piston chamber 31 and having an atmospheric port 32 opening at its outer face so that the same is always at atmospheric pressure.

The main slide valve is provided with exhaust cavity 33 adapted in release position of the parts to connect port 34 leading to the brake cylinder port 26 with exhaust port 35, service port 36 controlled by the auxiliary valve 10 and adapted to register with port 34 in service position, ports 37 and 38 adapted to register respectively with ports 23 and 26 in service position, in which position cavity 39 in the auxiliary valve 10 connects said ports, and through port 40 controlled by the auxiliary valve 10 and adapted in release position to register with port 41 leading to pipe 42 which communicates with the supplemental reservoir.

When air is charged into the brake pipe, the triple piston moves to release position in the usual manner and air flows through the feed groove around the piston charging the auxiliary reservoir to standard pressure. Air also flows through port 40 to port 41 and pipe 42 and charges the supplemental reservoir and the chamber at the outer face of abutment 13. The valve chamber 14 is supplied with air at auxiliary reservoir pressure through pipe 16 so that the inner face of abutment 13 is subject to auxiliary reservoir pressure. Thus the opposite sides of the abutment 13 are now subject to the same degree of fluid pressure. The piston 30 is of greater area than piston 20 and consequently the effective pressure on the valve chamber side of abutment 13 exceeds that on the opposite side thereof and so the parts are maintained in position shown in Fig. 1, the piston 30 being preferably provided with a seat, so as to make a tight joint when in the outer position and thereby prevent possible leakage from the supplemental reservoir to the atmosphere. A service application of the brakes may be made by reducing the brake pipe pressure in the usual manner, so that the preponderating auxiliary reservoir pressure shifts the triple valve piston to service position, the graduating valve 10 first closing port 40, uncovering port 36 and connecting ports 37 and 38 through cavity 39. The main slide valve 9 is then carried over to service position, in which the service port 36 registers with port 34 and thus permits air to flow from the auxiliary reservoir to the brake cylinder as usual. Ports 37 and 38 register with ports 23 and 26 so that fluid at brake cylinder pressure flows through port 38, cavity 39, port 37, port 23 and pipe 22 to chamber 21 at the outer face of piston 20. The moving parts of the valve mechanism are thus subject on one side to auxiliary reservoir pressure and brake cylinder pressure and on the opposite side to the pressure in the supplemental reservoir and the relative areas of the differential pistons 30 and 20 are such that for a certain predetermined brake piston travel the brake cylinder pressure on piston 20 rises at a rate which compensates for the fall of pressure in the auxiliary reservoir and on the inner face of the abutment 13 and the valve parts are maintained in their normal inactive position, but should the piston travel exceed this predetermined amount it will be seen that the rise in brake cylinder pressure is less than it should be for the rate at which the auxiliary reservoir pressure is falling and consequently the substantially constant supplemental reservoir pressure on the effective area of the abutment 13 preponderates over the brake cylinder and auxiliary reservoir pressures acting in the opposite direction and the parts are shifted to a position in which the cavity 28 in slide valve 15 connects passage 27, pipe 25 and passage 24. Air from the supplemental reservoir may then flow through pipe 17 passage 27, cavity 28, pipe 25 to brake cylinder port 26 and thence by pipe 2 to the brake cylinder 1. As soon as the brake cylinder pressure has risen by this flow of air so as to correspond with the fall in auxiliary reservoir pressure as calculated, then the sum of the auxiliary reservoir and brake cylinder pressures will exceed the supplemental reservoir pressure acting on the abutment 13 and the moving parts will be returned to normal position in which the flow of air from the supplemental reservoir to the brake cylinder is cut off. When the auxiliary reservoir pressure has reduced to a point slightly less than the brake pipe pressure the triple piston is shifted by the brake pipe pressure so that the graduating valve 10 is moved to lap the service port and cut off communication through the ports 37 and 38. But it will be noted that if the regulating valve mechanism is then in its inner position, the same continues to supply air from the supplemental reservoir to the brake cylinder for the reason that pipe 25 leads directly to the brake cylinder port 26 and so the brake cylinder remains open to the reservoir, while the chamber 21 is also open to the brake cylinder, through the passage 24 and consequently the action of the auxiliary reservoir and brake cylinder pressures on the regulating valve mechanism is not affected by the movement of the triple valve parts to service lap position. The release of the brakes is accomplished in the usual manner by increasing the brake pipe pressure whereby the triple valve parts are moved to release position and the parts are again charged up to normal standard pressure in the same manner as hereinbefore described.

In Fig. 2 a construction is shown similar to that described in connection with Fig. 1 but having in addition, means for maintaining the brake cylinder pressure substantially constant at a predetermined degree corresponding with a given reduction in brake pipe pressure. For this purpose I preferably provide a maintaining valve mechanism comprising a casing 50 having a chamber containing a movable abutment or diaphragm 51, the chamber 52 on one side of which is in open communication through a pipe 53 with the brake cylinder while chamber 54 on the opposite side communicates with a small regulating reservoir 55 by way of pipe 56 and also communicates through pipe 57 with a port 58 in the seat of the main slide valve 9. The diaphragm 51 is adapted to operate a valve 59 which controls communication from the supplemental reservoir 18, which is connected by pipe 60 to the valve chamber on one side of the valve, to chamber 52 which is open to the brake cylinder. An additional port 61 is provided in the main slide valve 9, which is adapted to register with port 58 in service position and cavity 39 is provided with a port extension 62 which registers with port 61 in this position. It will now be seen that when a service application of the brakes is made the movement of the triple valve connects the regulating chamber 55 through pipe 57 port 58, port 61 in the main slide valve, port extension 62 and cavity 39 in the auxiliary valve, and port 38 with brake cylinder port 26, so that air at brake cylinder pressure is admitted to the chamber, and the triple piston moving back to lap position causes the graduating valve 10 to close the port 61 thereby sealing air in chamber 55 at a given brake cylinder pressure corresponding with the reduction in brake pipe pressure. Should the brake cylinder pressure fall on account of leakage of fluid therefrom, the sealed pressure in chamber 54 on one side of diaphragm 51 will preponderate over the reduced brake cylinder pressure in chamber 52 on the opposite side thereof, so that the diaphragm is thereupon operated to open the valve 59 and admit fluid under pressure from the supplemental reservoir to the brake cylinder, and upon the flow of air from the supplemental reservoir raising the brake cylinder pressure to equal that in the regulating chamber the valve 59 is again closed. Thus the brake cylinder pressure is maintained substantially constant for a given brake pipe reduction throughout an application of the brakes.

The ordinary standard brake piston travel is eight inches, but in order to secure a wider range of operation with my improvements, I may so proportion the parts, that air will be supplied to the brake cylinder thereby when the brake piston travel exceeds a lesser amount, say four to six inches, thus providing for greater variations in piston travel than would otherwise be the case.

Having now described my invention, what I claim as new and desire to secure by Letters Patent, is:—

1. In a fluid pressure brake, the combination with a triple valve and brake cylinder, of a valve device operating in response to variations in auxiliary reservoir pressure for supply air to the brake cylinder.

2. In a fluid pressure brake, the combination with a triple valve, auxiliary reservoir, and brake cylinder, of a valve device subject to auxiliary reservoir and brake cylinder pressures in one direction and to a substantially constant pressure in the opposite direction for supplying air to the brake cylinder.

3. In a fluid pressure brake, the combination with a brake cylinder, auxiliary reservoir, and a triple valve device for supplying air from the auxiliary reservoir to the brake cylinder in service applications of the brakes, of a valve device subject to auxiliary reservoir and brake cylinder pressures tending to move same in one direction and to a substantially constant fluid pressure tending to move same in the opposite direction for also supplying air to the brake cylinder.

4. In a fluid pressure brake, the combination with a brake pipe, brake cylinder, auxiliary reservoir, and a triple valve device operated by a reduction in brake pipe pressure for supplying air from the auxiliary reservoir to the brake cylinder, of a valve device comprising a differential piston means subject in one direction to auxiliary reservoir and brake cylinder pressures and in the opposite direction to a substantially constant fluid pressure, and a valve operated by said piston for supplying air to the brake cylinder.

5. In a fluid pressure brake, the combination with a brake cylinder, auxiliary reservoir, and triple valve device, of a valve device normally subject to the opposing pressures of the auxiliary reservoir and a chamber for controlling ports adapted to supply air to the brake cylinder and tending upon reduction of auxiliary reservoir pressure in applying the brakes to move to a position for opening said ports and means operated upon movement of the triple valve device to service application position for admitting fluid at brake cylinder pressure to act on said valve device in a direction tending to close said ports.

6. In a fluid pressure brake, the combination with a brake cylinder, auxiliary reservoir, a triple valve device, of a supplemental reservoir and a valve device comprising a valve for controlling communication from said supplemental reservoir to the brake cylinder and a differential piston subject on one side to supplemental reservoir pressure and on the opposite side to auxiliary reservoir pressure, said triple valve device having ports adapted in service position to supply air from the brake cylinder to said differential piston in a direction opposing the supplemental reservoir pressure.

7. In a fluid pressure brake, the combination with a brake cylinder and a triple valve device, of a valve device operating in service applications for supplying air to the brake cylinder to compensate for variations in brake piston travel and means for maintaining the brake cylinder pressure constant.

8. In a fluid pressure brake, the combination with a brake cylinder and triple valve device, of a valve device operating in service applications of the brakes according to the degree of auxiliary reservoir and brake cylinder pressures for supplying air to the brake cylinder and means subject to the opposing pressures of the brake cylinder and a regulating chamber for maintaining the pressures in the brake cylinder at a predetermined degree.

9. In a fluid pressure brake, the combination with a brake cylinder and triple valve device, of a valve device subject to the opposing pressures of the auxiliary reservoir and a constant pressure and operating according to the degree of brake cylinder pressure produced by a given fall in auxiliary reservoir pressure for supplying air to the brake cylinder to produce a predetermined brake cylinder pressure corresponding with the reduction in brake pipe pressure and means subject to the opposing pressures of the brake cylinder and a regulating chamber for then maintaining the brake cylinder pressure constant.

In testimony whereof I have hereunto set my hand.

WALTER V. TURNER.

Witnesses:
 WM. M. CADY,
 A. M. CLEMENTS.

---

Copies of this patent may be obtained for five cents each, by addressing the "Commissioner of Patents, Washington, D. C."